United States Patent

Fartmann et al.

Patent Number: 5,441,117
Date of Patent: Aug. 15, 1995

[54] COUPLING HOOK FOR THE LOWER STEERING ARMS OF A THREE-POINT ATTACHING DEVICE OF A TRACTOR

[75] Inventors: Norbert Fartmann, Siegburg; Joachim Laubner, Ahrweiler; Norbert Müller, Ruppichteroth, all of Germany

[73] Assignee: GKN Walterscheid GmbH, Lohmar, Germany

[21] Appl. No.: 141,410

[22] Filed: Oct. 22, 1993

[30] Foreign Application Priority Data

Oct. 23, 1992 [DE] Germany .......... 42 35 780.2

[51] Int. Cl.⁶ .......... A01B 59/043
[52] U.S. Cl. .......... 172/272; 172/439; 280/504; 280/461.1
[58] Field of Search .......... 172/49.5, 59, 68, 125, 172/272, 278, 287, 439, 273, 274, 275; 37/231; 403/327, 330, 325, 317; 414/728, 686, 703, 920; 280/507, 504, 508, 510, 460 A, 461 A

[56] References Cited

U.S. PATENT DOCUMENTS

| | | | |
|---|---|---|---|
| 3,195,651 | 7/1965 | Todd | 172/272 |
| 3,404,901 | 10/1968 | Rau | 172/272 |
| 3,807,769 | 4/1974 | Thompson et al. | 172/272 |
| 4,241,935 | 12/1980 | Vollmer et al. | 172/272 |
| 4,366,967 | 1/1983 | Vollmer et al. | 172/272 X |
| 4,415,175 | 11/1983 | Kainer | 280/460 |
| 4,549,744 | 10/1985 | Herr et al. | 172/272 |
| 4,944,354 | 7/1990 | Langen et al. | 172/272 X |
| 5,050,684 | 9/1991 | Vollmer | 172/272 |
| 5,076,369 | 12/1991 | Herchenbach | 172/439 |

Primary Examiner—Randolph A. Reese
Assistant Examiner—Robert Pezzuto
Attorney, Agent, or Firm—Harness, Dickey & Pierce

[57] ABSTRACT

A coupling hook (5) for the lower steering arms (3) of a three-point attaching device of a tractor has a hook body (6) with a locking pawl (7). The pawl (7) is spring-loaded in the direction of the locking position. The locking pawl (7) is arranged in a recess (12) of the hook body (6) and projects through an aperture (13) into a bearing recess (10), which receives a bearing ball (11). For the purpose of supporting and guiding the locking pawl (7), the hook body (6) includes a first stop face (14), a second supporting stop (15) offset backwardly at a distance therefrom and a locking stop (16). In the locking position, the locking pawl (7) is supported on the looking stop (16) via a first supporting face (19), a second supporting face (21) and a locking face (22). The design is such that the contact between the locking face (22) and the locking stop (16) takes place below an imaginary connecting line (27) which is between the point of contact of the locking face (25) of the locking pawl (7) with the outer face (26) of the bearing ball (11), on the one hand, and the center (29) of the convex locking stop (16) on the other hand. An improved locking affect is ensured.

16 Claims, 12 Drawing Sheets

COUPLING HOOK FOR THE LOWER STEERING ARMS OF A THREE-POINT ATTACHING DEVICE OF A TRACTOR

BACKGROUND OF THE INVENTION

The invention relates to a coupling hook, especially for the lower steering arms of a three-point attaching device of a tractor. The coupling has a hook body, a locking pawl spring-loaded towards the locking position and means for moving the locking pawl into the open position. The hook body includes a bearing recess, open towards one end, for the bearing ball of an implement to be attached, a recess for receiving the locking pawl, an aperture for allowing part of the locking pawl to enter the region of the bearing recess, a first stop face provided by the face of the aperture arranged towards the open end of the bearing recess, a second supporting stop arranged at a distance therefrom, and a locking stop arranged away from both stops in the direction of the bearing recess to secure the locking pawl in the locking position.

The locking pawl, on its upper face, includes a first supporting face cooperating with the first stop face. On its underside, it includes a second supporting face cooperating with the second supporting stop. Towards its rear end, it includes a locking face cooperating with the locking stop. At its front end entering the bearing recess, it includes an unlocking face. Also, the locking pawl includes a projection which projects downwardly beyond the second supporting face to limit the setting movement of the locking pawl and a locking face to arrest the bearing ball in the bearing recess.

A coupling hook is described in U.S. Pat. No. 4,126,057, issued Nov. 21, 1978. A coupling hook part projects outwardly from a through-aperture. The projecting part of the coupling hook is provided with an actuating cable for opening the locking pawl. However, this design of the locking pawl and the way it is supported relative to the locking stop are such that if the locking pawl is subject to any influences when in operation, for instance if it is affected by the bearing pin or by branches or the like, the locking pawl may open.

SUMMARY OF THE INVENTION

It is an object of the invention to provide a coupling hook which, in all operating conditions, safely locks the bearing ball received in the bearing recess of the coupling hook. Also, if the bearing ball carries out rotational movements or if external influences occur when the bearing ball is in the coupled condition or if external influences affect the unlocking face in the sense of exerting an additional force on the locking pawl, moving the locking pawl into the hook body, the coupling remains locked. Furthermore, the looking means in accordance with the invention hold the locking pawl in the locking position even if the spring, for moving the locking pawl into the locking position fails.

In accordance with the invention, the locking stop of the hook body includes a face designed to be convex towards the locking face of the locking pawl. The locking face of the locking pawl contacts the locking stop of the hook body below an imaginary connecting line between the point of contact of the locking face of the locking pawl with the outer face of the bearing ball, on the one hand, and the center of the convex locking stop on the other hand. The locking face, starting from the point of contact between it and the locking stop towards the underside of the locking pawl, projects backwards beyond an imaginary circle whose center is formed by the point of contact of the first stop face of the hook body with the first supporting face of the locking pawl and extends through the point of contact of the locking stop of the hook body-with the locking face of the locking pawl.

An advantage of this design is when the bearing ball is locked in the bearing recess of the coupling hook by the locking pawl, any additional external force acting on the unlocking face does not enable opening of the locking pawl. This is due to the fact that, as a result of the selected points of support and articulation, the locking pawl has to carry out a movement in the direction of the bearing recess in order to be transferred into the open condition. However, the space is occupied by the bearing ball so that, when the bearing ball is in position, the locking pawl cannot be opened by any forces acting on its unlocking face. On the contrary, when such forces are applied and when the bearing ball is inserted, the locking effect is intensified because the locking pawl with its locking face is pushed further underneath the locking stop. If any forces are applied by the bearing ball on to the locking face of the locking pawl, such forces are introduced into the first stop face of the hook body by means of the first supporting face associated with the upper face of the locking pawl. If any moments occur, such forces are additionally introduced into the second supporting stop of the hook body by means of the second supporting face at the underside of the locking pawl.

The point of contact between the locking face, the locking ratchet and the locking stop is arranged such that the downwardly opening angle between the connecting line and a tangent at the point of contact between the locking face and the locking stop is an obtuse angle.

The locking stop of the hook body is preferably formed by a cylindrical pin inserted into the hook body. Alternatively, it is possible to provide a cylindrical pin made of solid material. However, in addition, the contour of the hook member may be such that it forms the locking stop. In one embodiment of the invention, the second supporting stop of the hook body is also formed by a cylindrical pin, a tensioning pin or a supporting contour of the hook body.

Particularly advantageous supporting and locking characteristics are achieved if the locking stop of the hook body is arranged in the angular region between a first imaginary radial line which, starting from the point of contact between the locking face of the locking pawl and the outer face of the bearing ball, extends through the point of contact between the first stop face and the first supporting face of the locking pawl, and a second imaginary radial line which, starting from the above-mentioned point of contact, extends through the point of contact between the second supporting stop and the second supporting face.

In the case of an embodiment including an opening lever for the locking pawl, the locking stop serves as a pivot bearing for the opening lever. It also serves to guide the opening lever along at least part of its opening path.

A pivot pin provides an articulated connection between the opening lever and the locking pawl. For this purpose, one of the two parts, the opening lever or locking pawl, is provided with a bore whereas the other part includes the pivot pin. Preferably, play is provided between the bore and the pivot pin, so that even in the locking position, the opening lever is not subjected to any supporting forces originating from the locking pawl. The latter is supported entirely by the first stop face of the hook body and the second supporting stop and the locking stop.

In case the coupling hook includes the possibility of being arrested in the open position, an oblong hole is provided which receives the pivot pin. Furthermore, the opening lever is supported on fixing contours of the hook body and/or of the locking stop for the purpose of arresting the locking pawl in the open position.

One of the fixing contours is preferably formed by the outer face of the locking stop of the hook body. The other fixing contour is formed by a step in the region of the through-aperture for the opening lever in the hook body.

Alternatively, to enable the locking pawl to be moved by an opening lever into the open position, it is possible for the pawl to be moved by a cable acting on the pawl. There is a further design possibility in that the locking pawl may be actuated by Bowden cable means, the cable of the means acting on the locking pawl and the cover being supported on the hook body.

According to a further design variant it is possible for the opening lever, along its entire pivot path, to be pivotably supported on the locking stop, and for the opening lever to be provided with an oblong hole, with the pivot pin associated with the locking pawl passing through the hole.

From the following detailed description taken in conjunction with the accompanying drawings and subjoined claims, other objects and advantages of the present invention will become apparent to those skilled in the art.

BRIEF DESCRIPTION OF THE DRAWINGS

Preferred embodiments of the invention are diagrammatically illustrated in the drawing wherein.

DETAILED DESCRIPTION OF THE PREFERRED EMBODIMENTS

Figure 1:
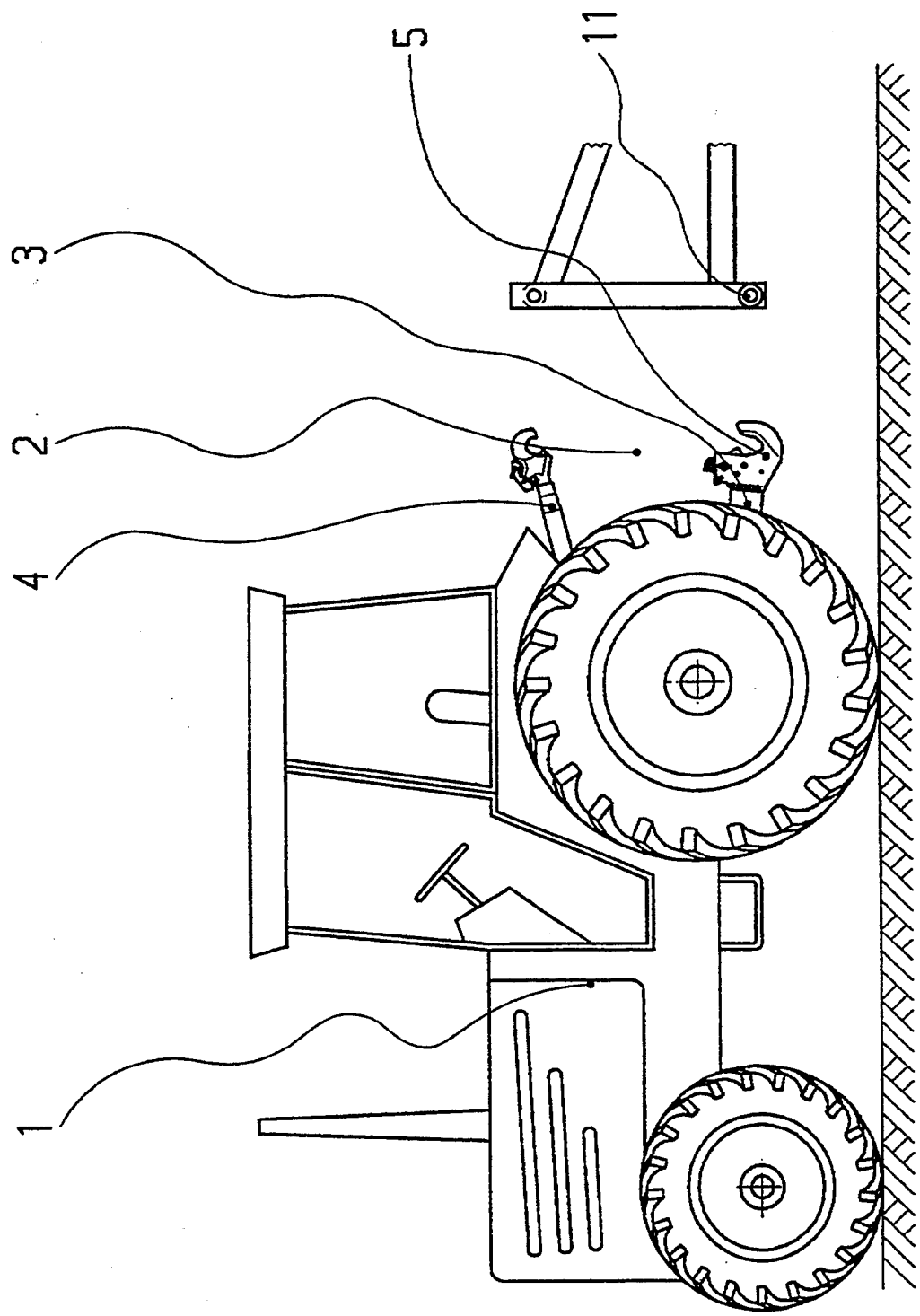
FIG. 1 is a diagrammatic view of a tractor with a three-point attaching device and coupling hook, also indicating the coupling points of an implement (not shown in greater detail).

FIG. 1 shows a tractor 1 having a three-point attaching device 2 at its rear end. The three-point attaching device includes the two lower steering arms 3, one of which is visible, which are arranged at the ends of, and at a distance from, the longitudinal axis of the tractor 1. The upper steering arm 4 is arranged on the longitudinal axis of the tractor 1 above the two lower steering arms 3. The ends of the two lower steering arms 3 are provided with coupling hooks 5 which serve to receive bearing balls 11 of an agricultural implement, indicated in the uncoupled position by the coupling points. A similar three-point attaching device may be provided at the front end of the tractor 1.

Figure 2:
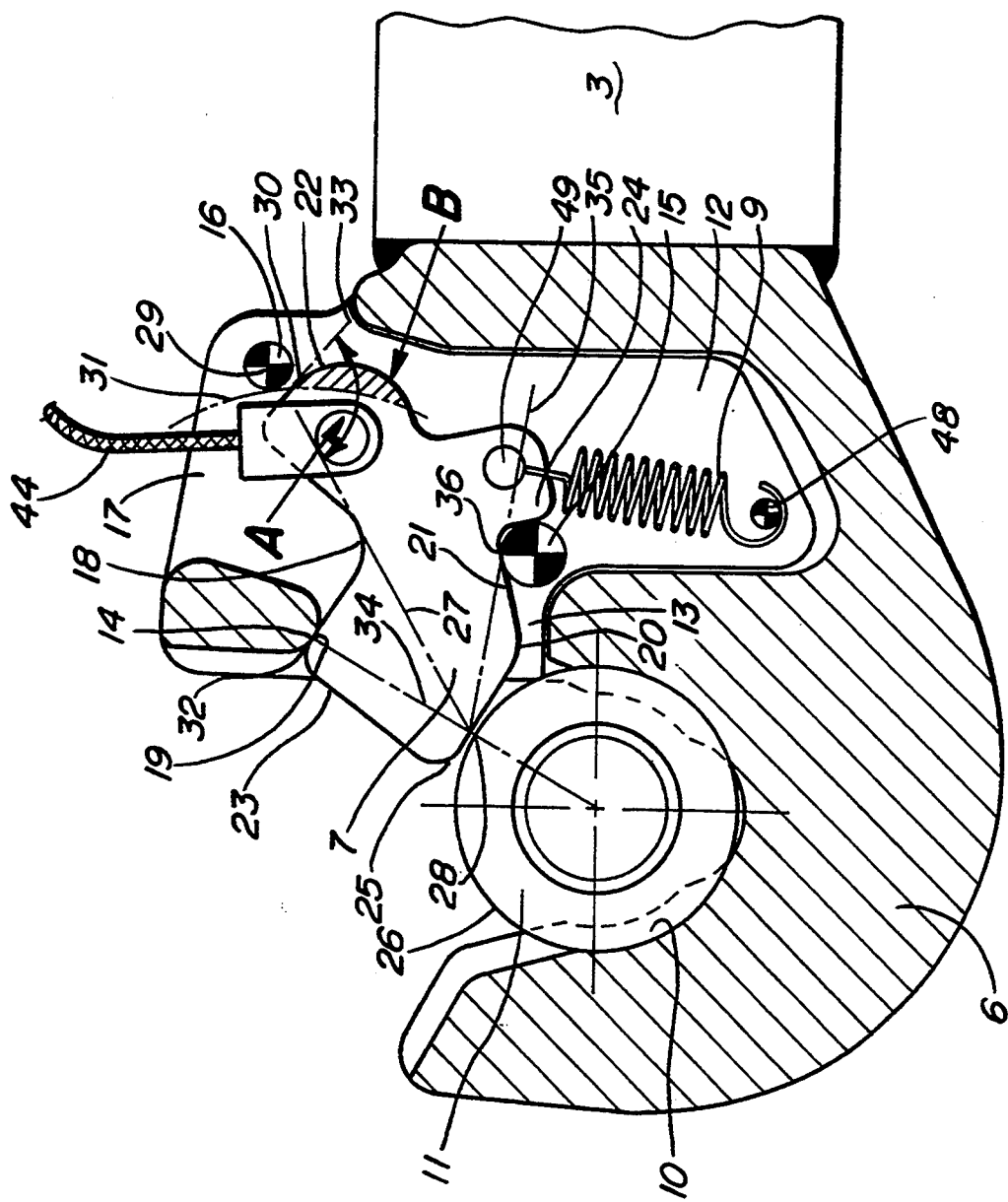
FIG. 2 is a side view partially in section of a coupling hook with the housing cover removed and with the locking pawl in the locking position.
Figure 3:
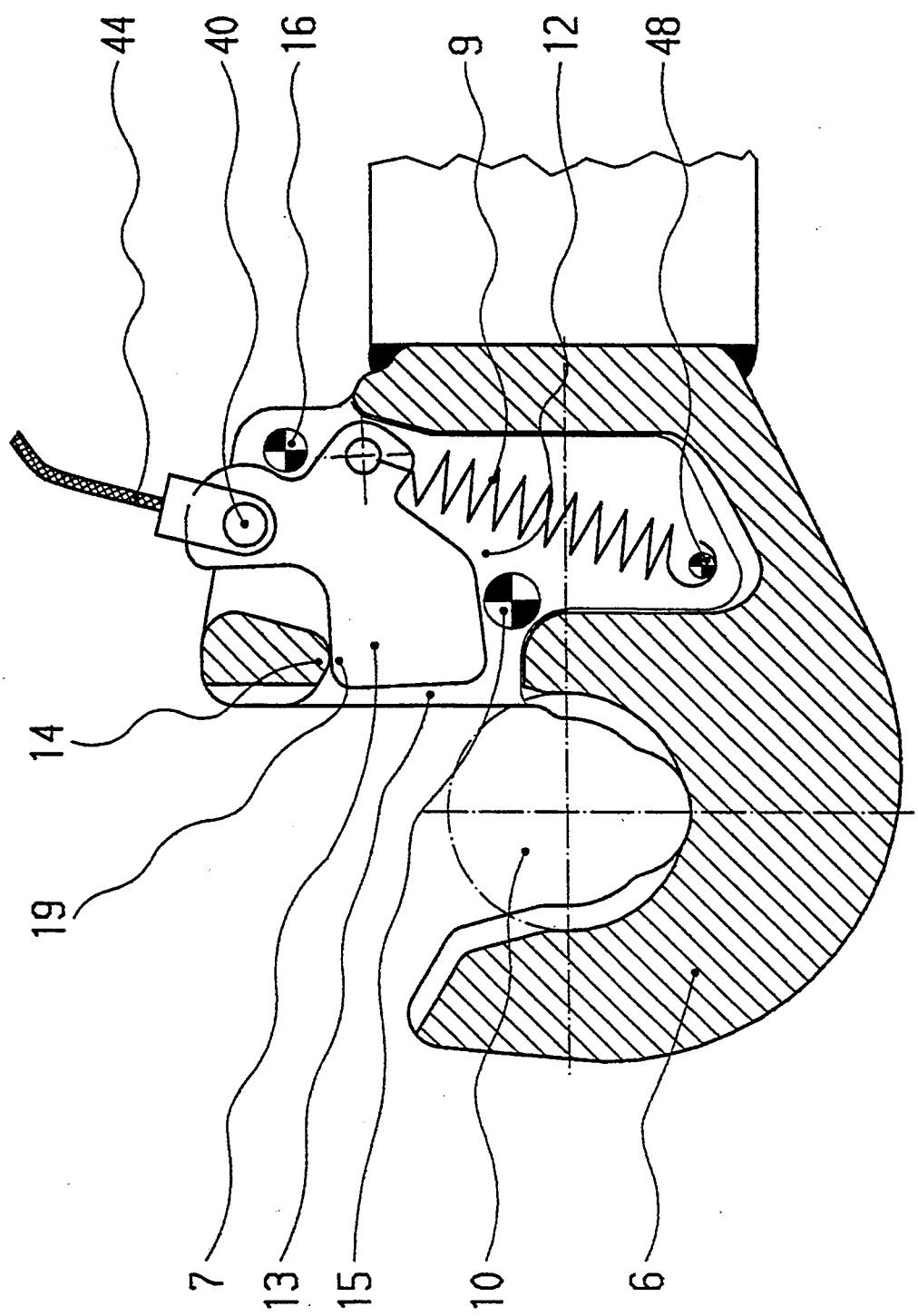
FIG. 3 is a view like FIG. 2, with the locking pawl transferred into the open position by hand.
Figure 4:
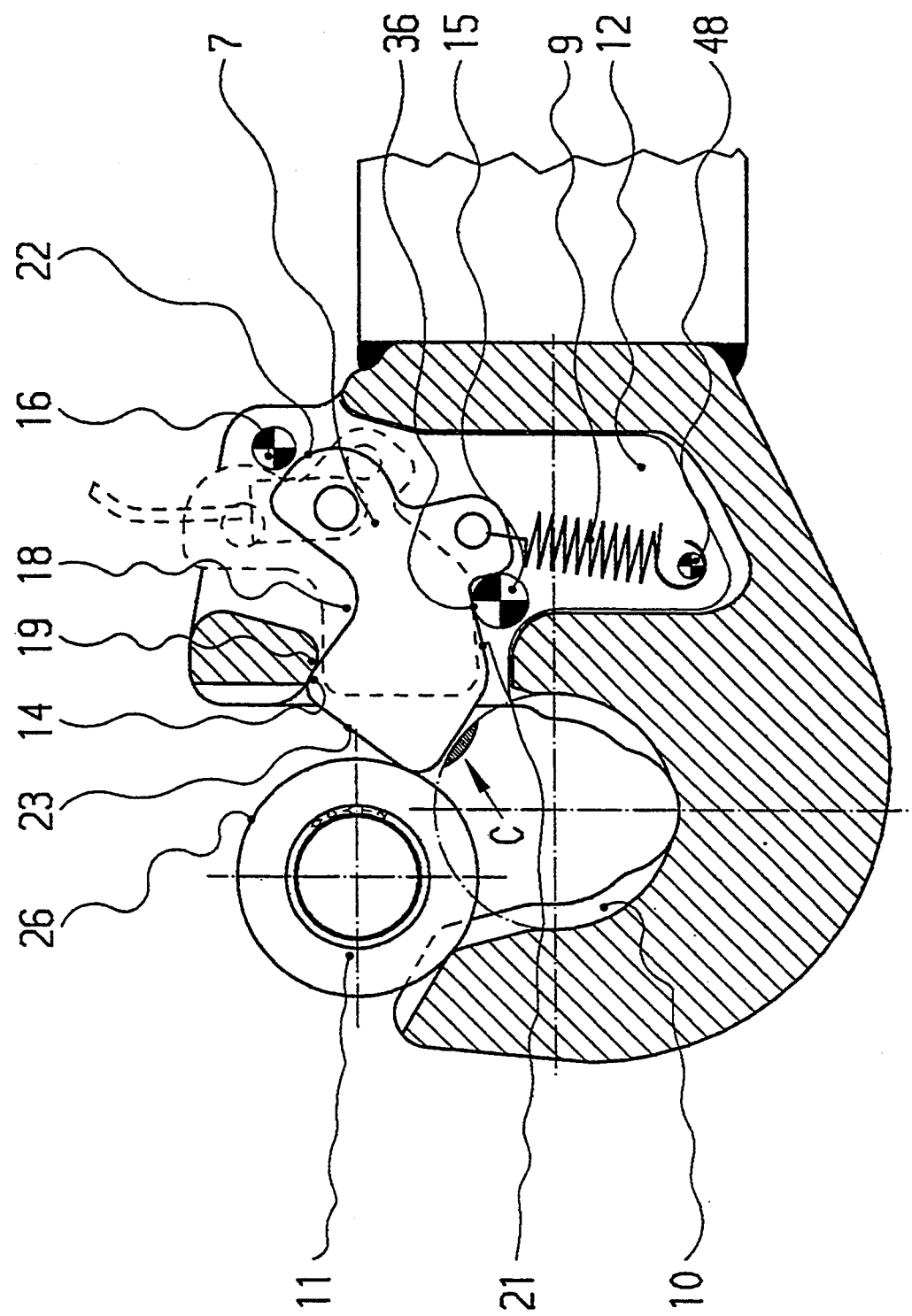
FIG. 4 is a view like FIG. 2, with the locking pawl opened by the bearing ball.

The various embodiments of the coupling hook 5 are explained in greater detail in FIGS. 2 to 11. The principle of locking the coupling hook 5 and its design are shown in FIGS. 2 to 4.

FIG. 2 shows how the coupling hook 5 is arranged relative to the lower steering arm 3. The coupling hook 5 includes a hook body 6 with an upwardly open bearing recess 10. The bearing recess 10 serves to receive an externally spherical ball 11 associated with the implement to be attached.

Furthermore, the hook body 6 includes a recess 12 provided with an aperture 13 which opens towards the bearing recess 10. The recess 12 receives a locking pawl 7. In the position as illustrated in FIG. 2, the locking pawl partially projects into the opening region of the bearing recess 10.

The limiting wall between the recess 12 of the hook body 6 in the region of the aperture 13 and the bearing recess 10 serves as a first stop face 14. At an axial distance from the first stop face 14, in the direction of the lower steering arm 3, below the first stop face 14, a second supporting stop 15 is provided at the hook body 6. The second supporting stop 15 is provided in the form of a tensioning pin engaging a corresponding bore in the hook body 6. Further towards the rear, in the direction of the lower steering arm 3, above the second supporting stop 15, a locking stop 16 in the form of a tensioning pin is inserted into the hook body 6. However, the stops may also form part of the hook body 6. Upwardly, a through-aperture 17 is provided from the recess 12 into the free atmosphere. The locking pawl 7 is supported and guided by the first stop face 14, the second supporting stop 15 and the locking stop 16.

The locking pawl 7, at its upper face, includes a first supporting face 19 by means of which, in the locking position as illustrated, it rests against the first stop face 14. At the underside 20 of the locking pawl 7 a second supporting face 21 is provided to support the locking pawl 7 on the second supporting stop 15 of the hook body 6. At its rear end, the locking pawl 7 includes a locking face 22 which, in the locking position, serves to support the locking pawl 7 on the outer face of the locking stop 16. The front edge of the locking pawl 7 is provided with an inclined unlocking face 23 which, towards the underside 20, is followed by the locking face 25 which changes into the second supporting face 21. The locking face 25 is separated from the second supporting face 21 provided at the underside 20 by a radius transition. The faces are substantially straight faces extending at an angle in opposite directions.

The locking pawl 7 serves to lock the bearing ball 11 in the bearing recess 10 of the hook body 6. As a result of the outer face 26 of the bearing ball 11 stopping against the locking face 25, the bearing ball 11 is prevented from sliding out of the bearing recess 10.

Furthermore, the locking pawl 7 includes a projection 24 which serves as a stop to limit the movement of the locking pawl 7 in that it rests against the second supporting stop 15 in the position as illustrated in FIG. 2. The movement into the open position is limited by the projection 24 stopping against the locking stop 16. The underside 20 and the locking face 22 extend in such a way that positive locking is ensured. For this purpose, the locking face 22 extends relative to the outer face of the locking stop 16 in such a way that the point of contact 30 between the locking face 22 and the locking stop 16 is positioned below an imaginary connecting line 27. The connecting line 27 extends from the point of contact 28 between the locking face 25 and the outer face 26 of the bearing ball 11 to the center 29 of the convex locking stop 16.

The locking face 22 extends relative to the underside 21 of the locking pawl 7 in such a way that it backwardly projects beyond an imaginary circle 31 around the point of contact 32 between the first stop face 14 of the hook body 6 and the first supporting face 19 of the locking pawl 7. The hatched face B outside the circle 31 as shown in FIG. 2 causes the positive locking effect. In this way it is ensured that when the locking pawl 7 is under load when the bearing ball 11 is located in the bearing recess 10 in the enclosed position as shown in FIG. 2, a force is applied to the unlocking face 23 and it is impossible for the locking pawl 7 to move into the open position. With this type of load application, the locking pawl 7 with its looking face 22 is pushed further underneath the locking stop 16. There is thus obtained a safety lock which remains in the locking position, even it the spring 9 is broken.

The point of contact 30 may also be arranged such that between the connecting line 27 and a tangent 33, in the point of contact 30 with the locking face 22, an obtuse angle A is obtained.

The locking stop 16 is provided in an angular region between a first radial line 34 and a second radial line 35. Provided the locking stop is arranged in this region, safety locking conditions always prevail.

The first radial line 34 starts from the point of contact 28 between the locking face 25 of the locking pawl 7 and the outer face 26 of the bearing ball 11 and extends through the point of contact 32 between the first stop face 14 of the hook body 6 and the first supporting face 19 of the locking pawl 7. The second radial line 35 also starts from the first point of contact 28 and extends through the point of contact 36 between the second supporting face 21 and the outer face of the second supporting stop 15. The spring 9 is suspended on a pin 48 attached to the hook body 6 or on a suitable projection of the hook body 6. The other end of the spring 9 is suspended in an aperture 49 of the projection 24 of the locking pawl 7. When the locking pawl 7 rests against the second supporting stop 15, the spring 9 generates a clockwise moment around the stop, which moment ensures contact of the first supporting face 19 of the locking pawl 7 with the first stop face 14 of the hook body 6. For the purpose of holding the first supporting face 19 of the locking pawl 7 in contact with the first stop face 14 of the hook body 6 even in the course of the opening process, the operating line of the spring 9 is such that it extends behind the point of force application of the opening means in the direction of the locking stop 16.

If in the case of the position as illustrated in FIG. 2, an external force is applied to the unlocking face 23, the locking pawl would pivot downwardly around the point of contact 36. However, it is unable to do so because the outer face 26 of the enclosed bearing ball 11 prevents it from doing so. FIG. 4, below arrow Cl shows a hatched area which would have to be passed by the locking pawl 7 in order to be moved into the open position, however, this is not possible. The projecting face B also has a safety function. It prevents the locking pawl 7 from pivoting past the locking stop 16 after the locking pawl 7 has established contact with the outer face 26 of the bearing ball 11. For moving the locking pawl 7 by hand into the open position, there is provided a cable 44. It acts on the locking pawl 7 via a connecting yoke. Articulation is effected towards the rear end of the locking pawl 7. The locking pawl 7 is pulled into the locking position by the closing spring 9.

For moving the locking pawl 7 by hand from the locking position as shown in FIG. 2 into the open position according to FIG. 3, the locking pawl 7, by means of the cable 44, first has to be moved forwards in the direction of the bearing recess 10. This enables the locking pawl 7, with its locking face 22, to slide past the outer face of the locking stop 16. Next, with the part projecting forwards from the aperture 13 in the direction of the bearing recess 10, the pawl 7 moves along the first stop face 14 and enter the recess 12 and aperture 13 to release the bearing recess 10 to remove the bearing ball 11. In order to ensure such a direction of force even in the locking position illustrated in FIG. 2, when opening the locking pawl by hand, the operating line of the closing spring 9 is aligned such that it is positioned behind the point of articulation of the cable 44 at the locking pawl 7. When the cable 44 is released, the locking pawl 7, under the force of the spring 9, moves back into the position shown in FIG. 2. In the process, during the closing operation under the force of the spring 9, the locking pawl 7, with its first supporting face 19 provided at the upper face 18, moves along the first stop face 14 of the hook body 6 into the starting position.

When the locking pawl 7 is automatically opened by the bearing ball, starting from the position illustrated in FIG. 2, without there being a bearing ball in the bearing recess 10 of the hook body 6, a force is applied via the outer face 26 of the bearing ball 11 to the unlocking face 23 of the locking pawl 7. The force causes the locking pawl 7 to carry out a pivot movement around the point of contact 36 with the second supporting stop 15, while the locking pawl 7, with its second supporting face 21, simultaneously slides along the second supporting stop 15. While the movement is taking place, the locking face 22 moves past the locking stop 16 so that as the bearing ball 11 moves further into the bearing recess 10, the locking pawl 7 is pivoted upwards and slides more deeply into the recess 12 of the hook body 6 until the bearing ball 11 is able, fully, to engage the bearing recess 10. This process is followed by a locking process under the force of the spring 9. The locking pawl 7, with its second supporting face 21, slides forward on the second supporting stop 15 in the direction of the bearing recess 10 until the projection 24 comes to rest against the second supporting stop 15. Thereafter, a clockwise moment is applied to the locking pawl 7 until, with its first supporting face 19 provided at its upper face 18, it comes to rest against the first stop face 14 of the hook body 6. At the same time, the locking face 22 moves in front of the locking stop 16.

In all subsequently described embodiments according to FIGS. 5 to 12, the design of the locking pawl 7 corresponds to that shown in the embodiments according to FIGS. 2 to 4.

Figure 5:
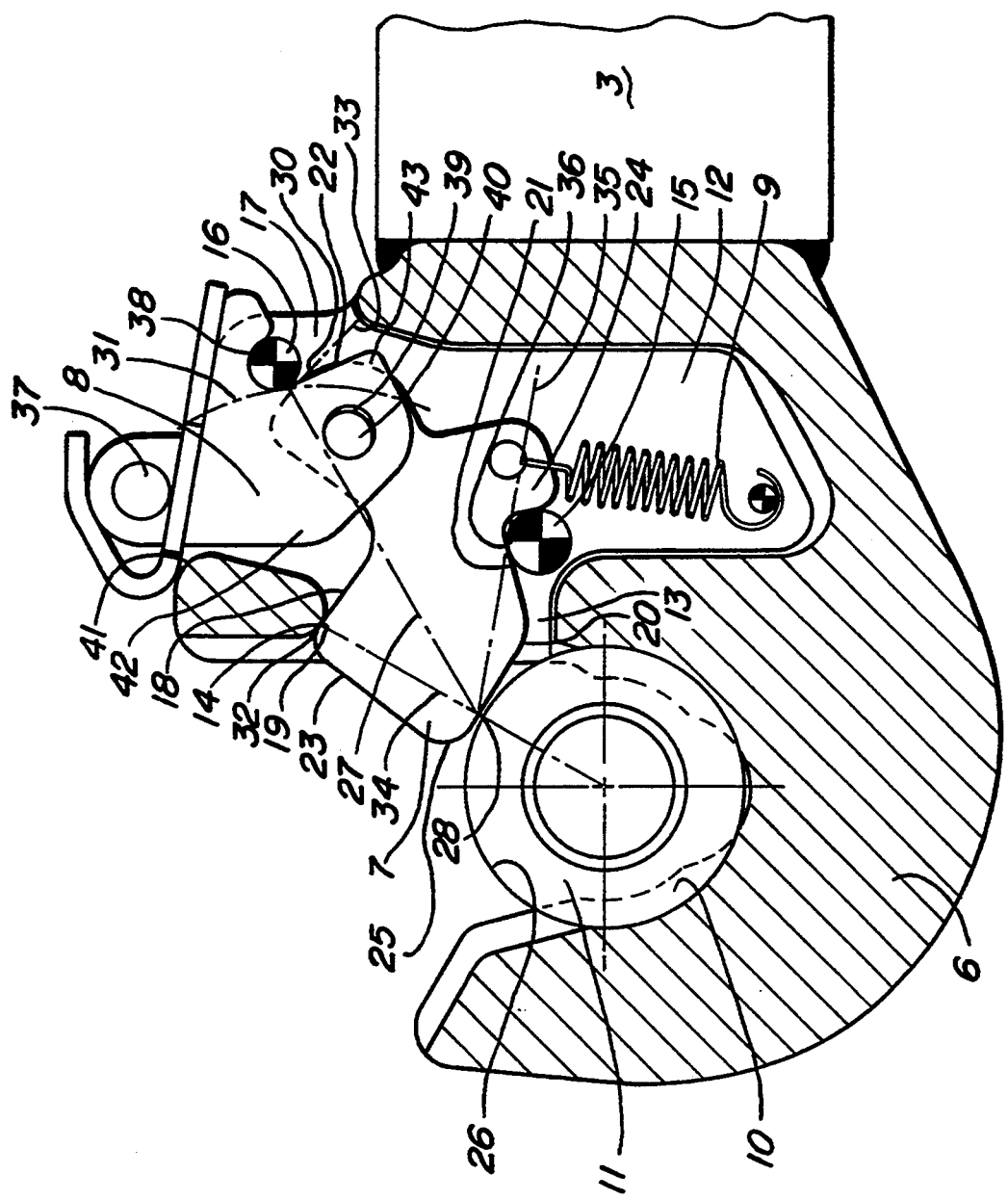
FIG. 5 is a side view partially in section of an embodiment of a coupling hook in the locked position with a first type of opening lever for opening the locking pawl.
Figure 6:
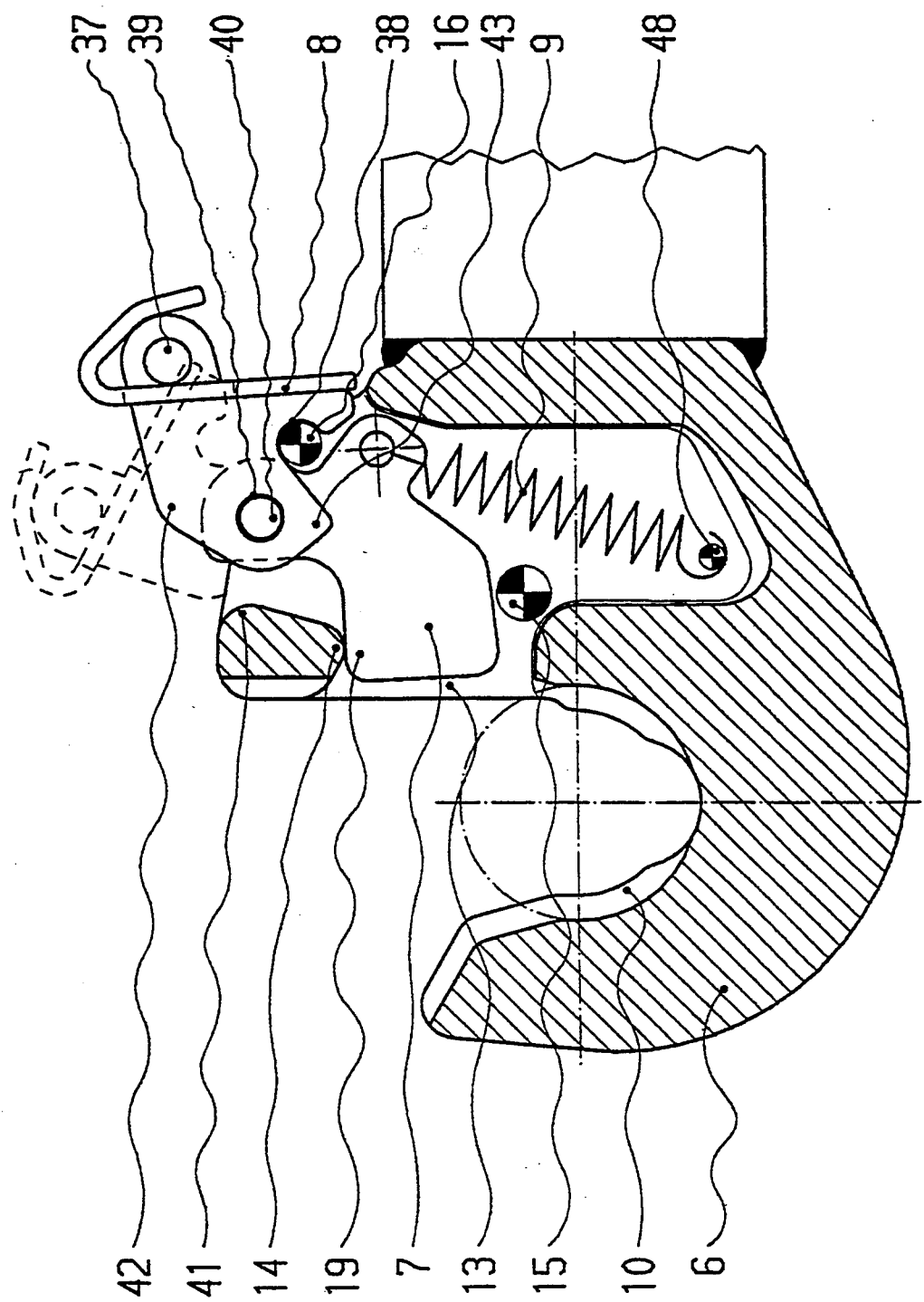
FIG. 6 is a view like FIG. 5 with the hook transferred into the open position by actuating a cable acting on the opening lever.
Figure 7:
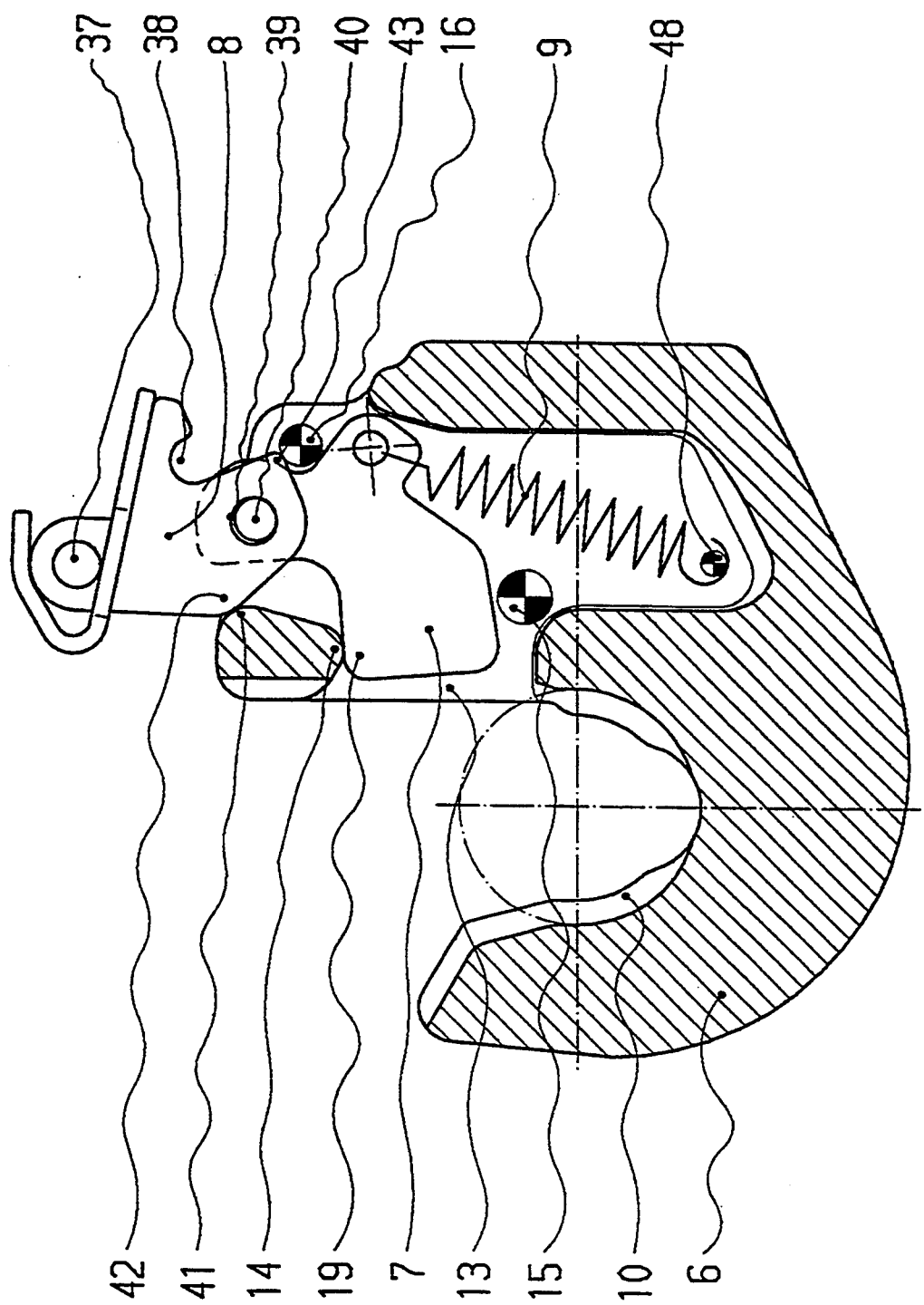
FIG. 7 is a view like FIG. 5, with the locking pawl being in the arrested open position.

In the embodiment according to FIGS. 5 to 7, the tensile cable 44 according to FIGS. 2 to 4 for actuating the locking pawl 7 is replaced by an opening lever 8. The opening lever includes a downwardly opening part-cylindrical bearing seat 38 by means of which, in the locking position according to FIG. 5, it rests on the locking stop 16 provided in the form of a tensioning pin. The locking pawl 7 is provided with a pivot pin 40 which passes through a bore 39 in the opening lever 8 and pivotably connects the locking pawl 7 and the opening lever 8. Between the bore 39 and the pivot pin 40 a sufficient amount of play is provided to ensure that in the loaded condition, the opening lever is free from forces acting on the locking pawl 7. The opening lever 8 includes an arresting stop 43 which, in the position as illustrated in FIG. 5, projects beyond the outer contour of the locking pawl 7 in the region of transition from the locking face 22 to the underside 20 of the locking pawl 7. The opening lever 8 is guided through the through-aperture 17 out of the hook body 6. At its end projecting out of the hook body 6, the opening lever 8 includes a suspension aperture 37 for an actuating cable. The actuating cable serves to remote-control the locking pawl 7. In the region of the through-aperture 17, a fixing contour 41 is provided which serves to fix the locking pawl 7 in the open position. This is described with reference to FIGS. 6 and 7. A further arresting stop 42 of the opening lever 8 cooperates with the fixing contour 41.

When pulling the actuating cable or opening lever 8, the latter, with its bearing seat 38, pivots from the locking position, as shown in FIG. 5, into the position illustrated in FIG. 6, with the front end of the locking pawl 7 being pulled out of the region of the bearing recess 10. By pulling the cable or lever further in a different direction, the bearing seat 38 also moves away from the locking stop 16. The locking pawl 7, with its underside 20, continues to slide upon the locking stop 16. By pivoting the opening lever 8 around the pivot pin 40 in a counter-clockwise direction, the opening lever 37, with its arresting stop 43, is mowed over the locking stop 16 and with its arresting stop 42 is moved to contact the fixing contour 41 in the region of the through-aperture 17 of the hook body 6 into the position as illustrated in FIG. 7. In this position, the locking pawl 7 is held above the spring 9 until a force is applied to the opening lever 8 in the clockwise direction and until the opening lever 8 is released to be able to move downwardly past the locking stop 16.

The locking pawl 7 is opened by means of the bearing ball 11 as described in connection with the embodiment according to FIGS. 2 to 4, but the opening lever 8 is pivoted by the bearing ball 11 acting on the unlocking face 23 and by the locking pawl 7. To ensure a positive locking effect in all situations, the center of the pivot pin 40 of the locking pawl 7 is arranged such that it is always positioned below the connecting line 27 described in connection with FIGS. 2 to 4. The design of the locking pawl 7 and of the hook body 6, relative to the arrangement of the locking stop 16, the first stop face 14 and the second stop face 15 corresponds to that shown in FIGS. 2 to 4.

Figure 8:
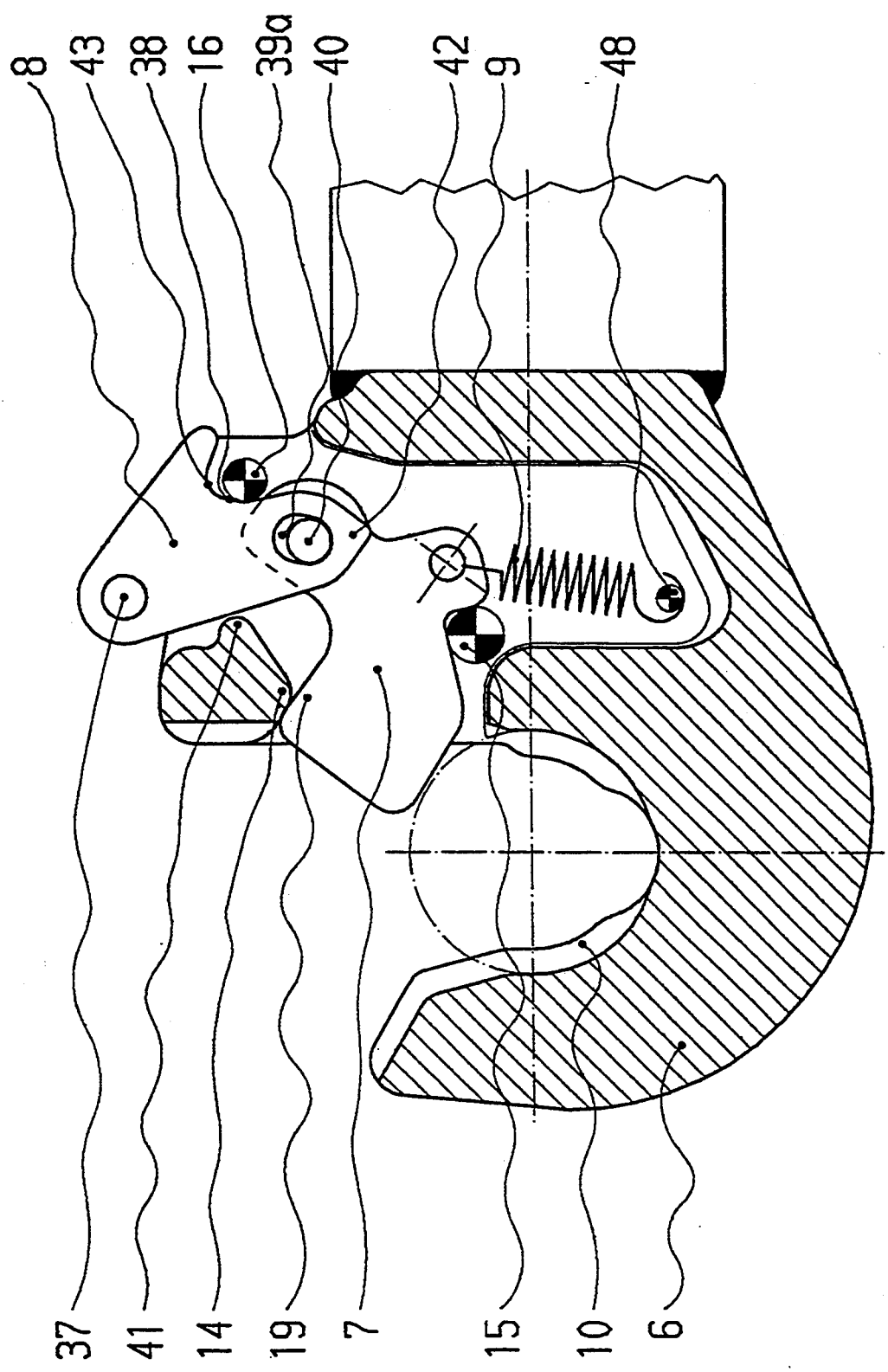
FIG. 8 is a side view partially in section of a further embodiment of a coupling hook in the locked position, with a different design opening lever having a stop engaging a step-shaped fixing contour of the hook body.
Figure 9:
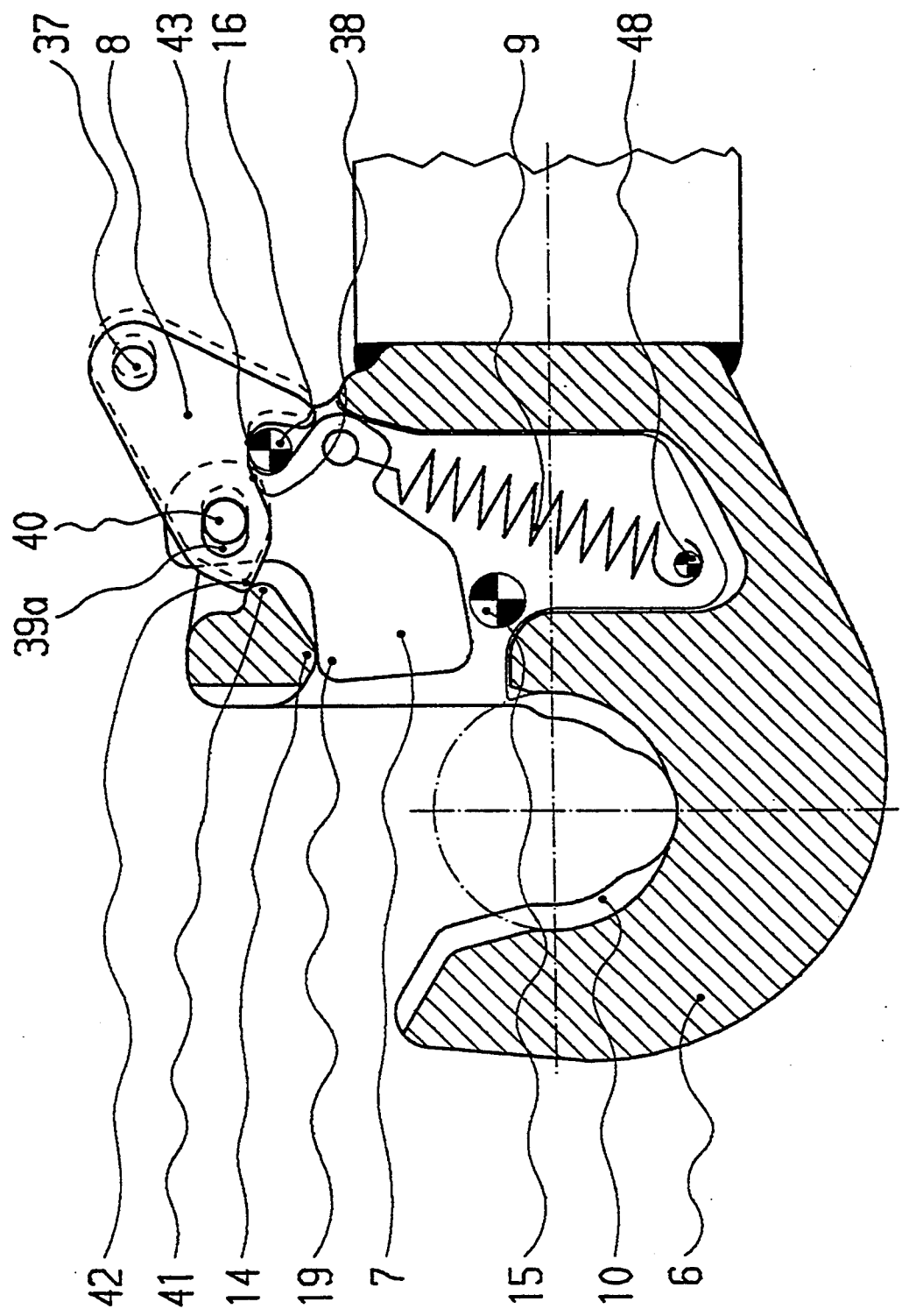
FIG. 9 is a view like FIG. 8 in the arrested open position.

FIGS. 8 and 9 show a further embodiment of the opening lever 8. The design of the locking pawl 7 and of the hook body 6 corresponds to that described in connection with FIGS. 2 to 4. The opening lever 8 is also provided with a bearing seat 38 which remains in contact with the locking stop 16 for only a certain part of the opening movement of the locking pawl 7. Furthermore, instead of a bearing bore with an increased diameter, there is provided an oblong hole 39a which permits the locking pawl 7 and the opening lever 8 to carry out the necessary movements relative to one another. FIG. 8 shows the locking position, whereas FIG. 9 shows the locking pawl 7 being arrested in the open position. The opening lever 8, with its rear face 38, has left the locking stop 16, but by means of its arresting stop 43 it continues to be in contact with the locking stop 16. By means of the arresting stop 42 provided at its front end, it engages a step-like fixing contour 41 of the hook body 6 when in the open position. With the help of this type of support, the locking pawl 7 is secured in the open position as shown in FIG. 9. Only by again moving the opening lever 8 first in the sense of pulling it and then by moving it counter clockwise, is it possible for the arresting stops 42, 43 to enter the space between the locking stop 16 and the fixing contour 41 of the hook body 6 to release the locking pawl 7 for enabling it to move into the locking position by means of the spring 9.

Figure 10:
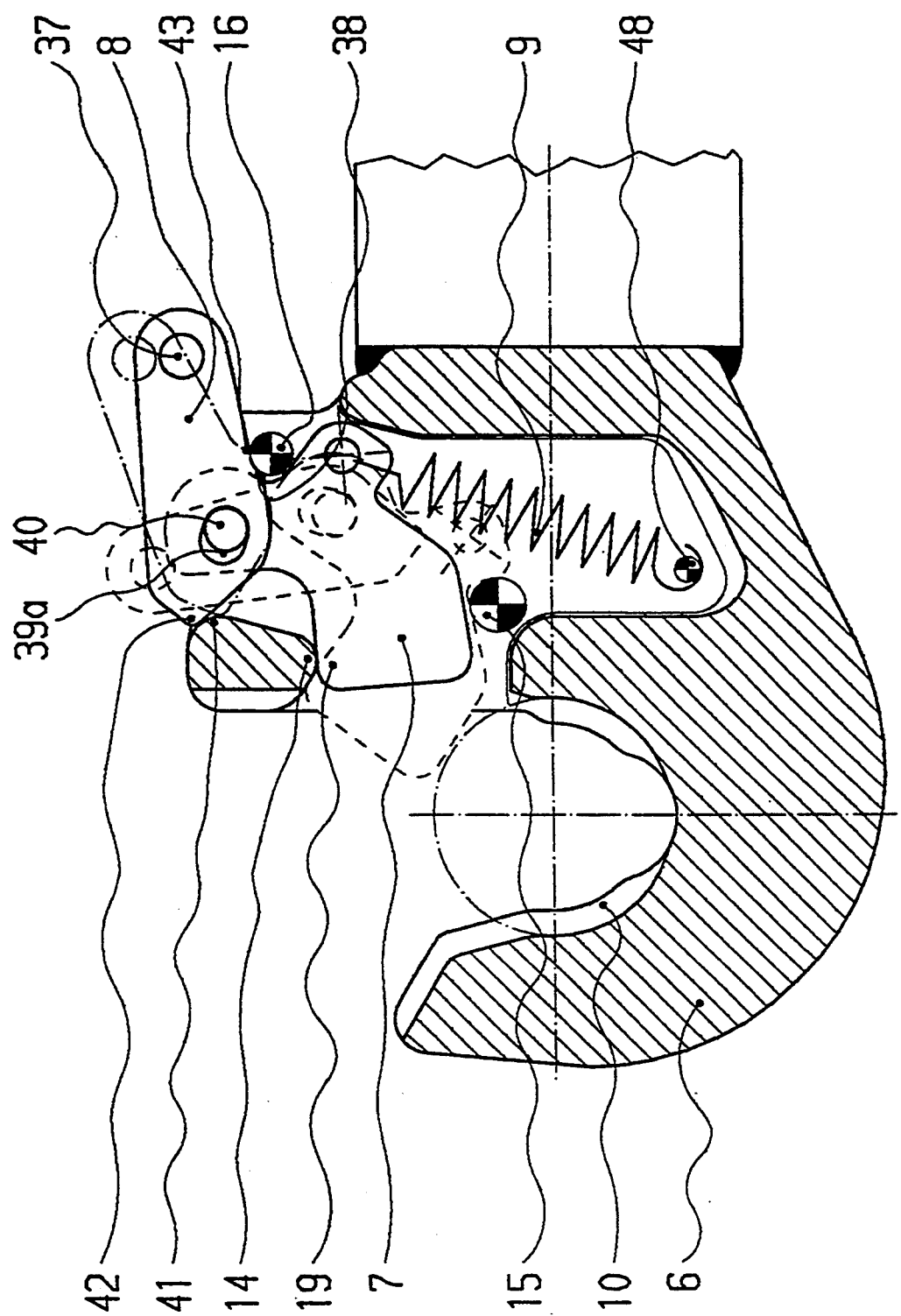
FIG. 10 is a side view partially in section of a further embodiment of a coupling hook, having a third embodiment of an opening lever for arresting the locking pawl in the open position.

The embodiment according to FIG. 10 contains a further design of the opening lever 8. For the purpose of moving the locking pawl 7 from the position illustrated in dashed lines into the position arrested in the open condition as illustrated by continuous lines, the opening lever 8, with its outer contour, is supported on the looking stop 16. When moved clockwise, the locking pawl 7 is pulled back until the opening lever 8, with its arresting stop 42, has passed the narrowest point of the through-aperture 17 and until, by means of the arresting stop 42 provided at its projection and by means of the arresting stop 43 displaced relative thereto, it is able to support itself on the outer face of the looking stop 16. It is held in this position by the closing spring 9.

Figure 11:
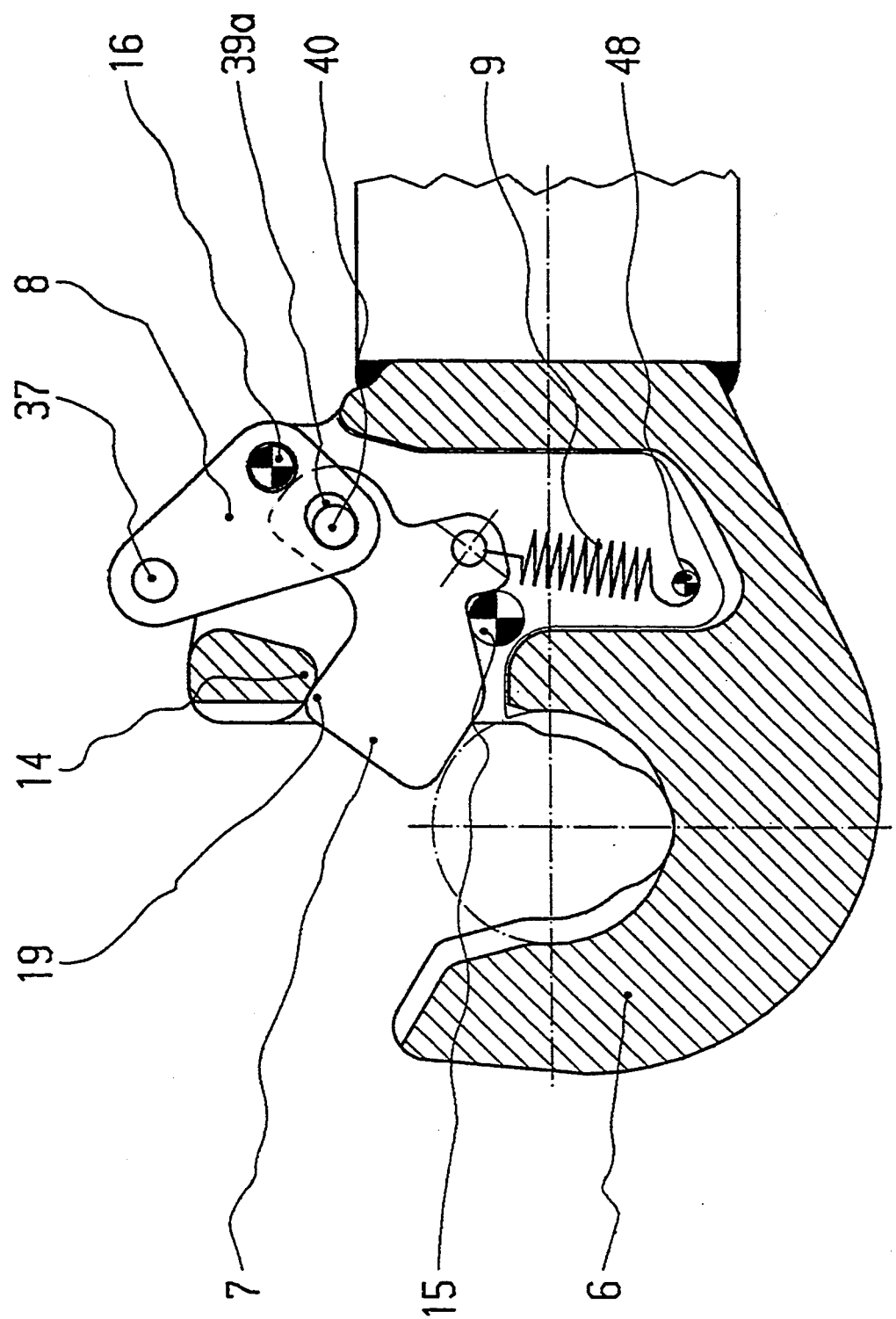
FIG. 11 is a side view partially in section of a coupling hook with a fourth embodiment of an opening lever which is held so as to be pivotable around the locking stop, with the locking pawl not being designed to be arrested in the open position.

FIG. 11 shows an embodiment of a coupling hook 5 wherein the locking pawl 7 is not arrested in the open position. However, the locking pawl 7 is again moved by an opening lever 8 which is connected to the opening lever 8 by a pivot pin 40 provided at the locking pawl 7. It passes through an oblong hole 39a in the opening lever 8. The opening lever 8 is provided with a bore by means of which it is pivotably held on the locking stop 16 provided in the form of a tensioning pin. By pivoting the opening lever 8 around the locking stop 16, the locking pawl 7 is pivoted and pulled in as described in connection with FIGS. 2 to 4.

Figure 12:
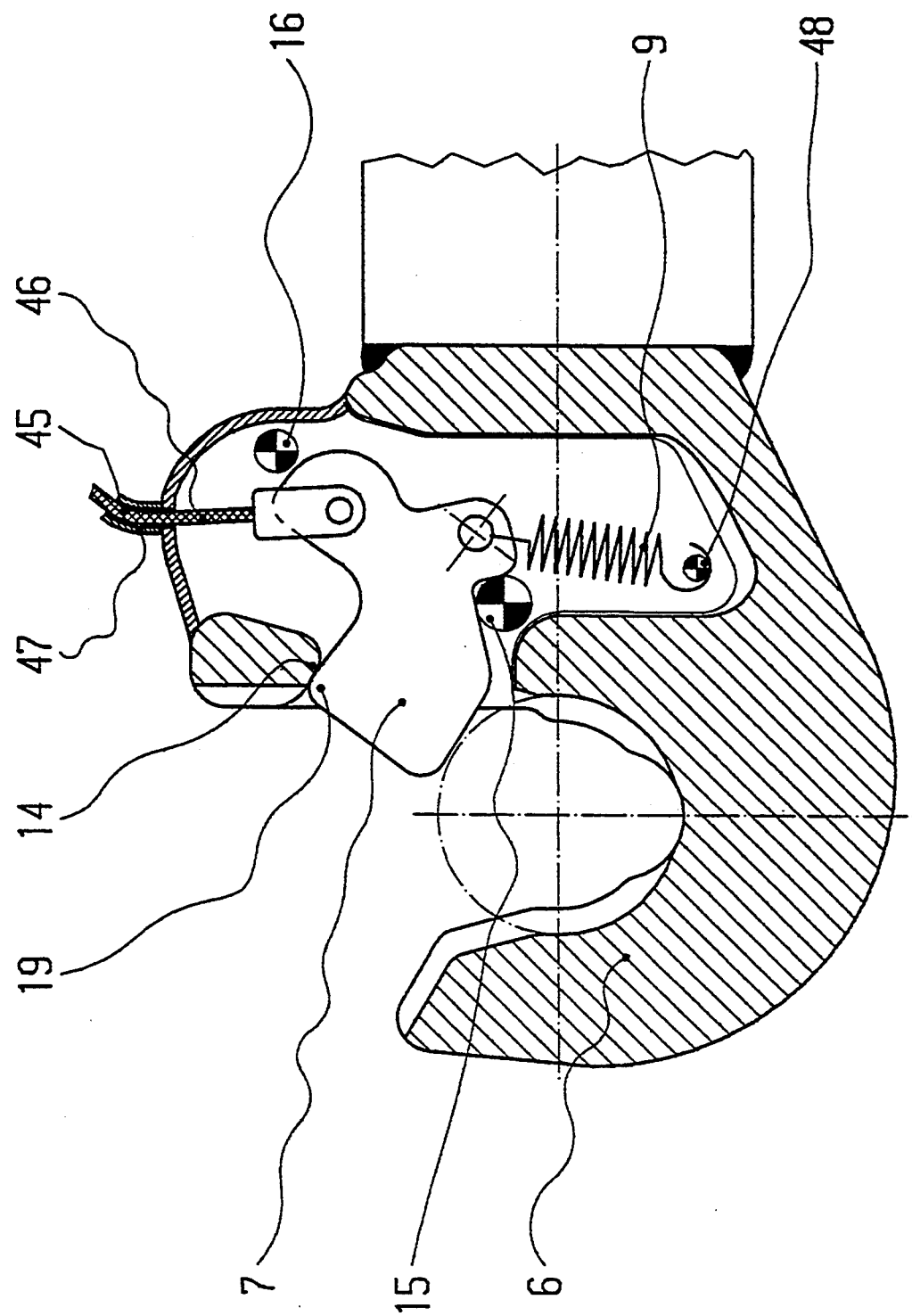
FIG. 12 is a view like FIG. 2 having Bowden cable means for actuating the locking pawl.

FIG. 12 shows a further embodiment where instead of a cable, a Bowden cable means 45 is provided. The embodiment according to FIG. 12 differs from that shown in FIGS. 2 to 4 in that the cable 46 directly acting on the locking pawl 7 is additionally provided with a hose-type cover 47 which is supported on the outside of the hook body 6.

We claim:

1. A coupling hook, especially for lower steering arms of a three-point attaching device of a tractor, comprising:

a hook body;

a locking pawl spring-loaded towards a locking position;

means for moving the locking pawl into an open position;

said hook body including a bearing recess open towards one end for a bearing ball of an implement to be attached, a recess for receiving the locking pawl, an aperture for allowing part of the locking pawl to enter the region of the bearing recess, a first stop face is provided by a face of the aperture arranged towards the open end of the bearing recess, a second supporting stop is arranged at a distance therefrom, and a locking stop is arranged away from both said stops in the direction of the bearing recess for securing the locking pawl in the locking position;

the locking pawl includes a first supporting face on an upper face of said locking pawl cooperating with the first stop face, and includes on an underside of said locking pawl a second supporting face cooperating with the second supporting stop, a locking face is included at a rear end of said locking pawl cooperating with the locking stop, an unlocking face is included at a front end in said locking pawl entering the bearing recess, a projection projecting downwardly beyond the second supporting face for limiting the setting movement of the locking pawl and a locking face for arresting the bearing ball in the bearing recess, the locking stop of the hook body includes a face designed to be convex towards the locking face of the locking pawl, the locking face of the locking pawl contacts the locking stop of the hook body below an imaginary connecting line between a point of contact of the locking face of the locking pawl with an outer face of the bearing ball and the center of the convex locking stop, and the locking face of the locking pawl, starting from the point of contact between it and the locking stop towards the underside of the locking pawl, projects backwards beyond an imaginary circle whose center is formed by the point of contact of the first stop face supporting face of the locking pawl and extends through the point of contact of the locking stop of the hook body with the locking face of the locking pawl.

2. A coupling hook according to claim 1, wherein a downwardly opening obtuse angle is formed between the connecting line and a tangent in the point of contact between the locking face and the locking stop.

3. A coupling hook according to claim 1, wherein the locking stop of the hook body is formed by a cylindrical pin, a tensioning pin or a contour of the hook body.

4. A coupling hook according to claim 1, wherein the second supporting stop of the hook body is formed by a cylindrical pin, a tensioning pin or a supporting contour of the hook body.

5. A coupling hook according to claim 1, wherein the locking stop of the hook body is arranged in an angular region between a first imaginary radial line which, starting from the point of contact between the locking face of the locking pawl and the outer face of the bearing ball, extends through the point of contact between the first stop face and the first supporting face of the locking pawl, and a second imaginary radial line which, starting from the above-mentioned point of contact, extends through the point of contact between the second supporting stop and the second supporting face.

6. A coupling hook according to claim 3, wherein the locking stop serves as a pivot bearing for an opening lever, guiding said lever along at least part of its opening path.

7. A coupling hook according to claim 6, wherein the opening lever is connected to the locking pawl by means of a pivot pin so as to be articulated.

8. A coupling hook according to claim 7, wherein play exists between said pawl and lever such that the articulated connection between the locking pawl and opening lever enables the locking pawl to be freely adjustable relative to the opening lever.

9. A coupling hook according to claim 6, wherein the opening lever is supported on fixing contours of the hook body and of the locking stop for the purpose of arresting the locking pawl in the open position.

10. A coupling hook according to claim 9, wherein the opening lever or the locking pawl includes an oblong hole and pivot pin associated with the respective other part passes through said oblong hole.

11. A coupling hook according to claim 9, wherein one of the fixing contours is formed by the outer face of the locking stop of the hook body.

12. A coupling hook according to claim 9, wherein one of the fixing contours is formed by a step in the region of the through-aperture for the opening lever in the hook body.

13. A coupling hook according to claim 1, wherein the locking pawl is moved into the open position by means of a cable acting thereon.

14. A coupling hook according to claim 1 wherein the locking pawl is moved into the open position by Bowden cable means, the cable of said means acting on the locking pawl and a cover of said means being supported on the hook body.

15. A coupling hook according to claim 6, wherein along its entire pivot path, the opening lever is pivotably held by the locking stop and the opening lever is provided with an oblong hole, with the pivot pin associated with a locking pawl passing through said hole.

16. A coupling hook according to claim 6, wherein the opening lever is supported on fixing contours of the hook body or of the locking stop for the purpose of arresting the locking pawl in the open position.

* * * * *